United States Patent [19]
Umezawa

[11] Patent Number: 5,575,512
[45] Date of Patent: Nov. 19, 1996

[54] PIPE JOINT

[75] Inventor: Katsushi Umezawa, Numazu, Japan

[73] Assignee: Usui Kokusai Sangyo Kaisha Ltd., Japan

[21] Appl. No.: 410,240

[22] Filed: Mar. 24, 1995

[30] Foreign Application Priority Data

Mar. 29, 1994 [JP] Japan ................................ 6-082412

[51] Int. Cl.⁶ .................................................... F16L 39/00
[52] U.S. Cl. ........................................... 285/319; 285/382
[58] Field of Search ................................... 285/319, 382, 285/908, 424, 24

[56] References Cited

U.S. PATENT DOCUMENTS

| | | |
|---|---|---|
| 4,730,856 | 3/1988 | Washizu . |
| 4,776,616 | 10/1988 | Umehara et al. . |
| 4,895,396 | 1/1990 | Washizu . |
| 4,913,467 | 4/1990 | Washizu . |
| 4,915,420 | 4/1990 | Washizu . |
| 4,915,421 | 4/1990 | Dennany, Jr. ................. 285/319 X |
| 4,944,537 | 7/1990 | Usui et al. . |
| 4,946,205 | 8/1990 | Washizu . |
| 4,948,180 | 8/1990 | Usui et al. . |
| 4,964,658 | 10/1990 | Usui et al. . |
| 4,997,216 | 3/1991 | Washizu . |
| 5,048,875 | 9/1991 | Usui et al. . |
| 5,069,424 | 12/1991 | Dennany, Jr. et al. ............ 285/319 X |
| 5,090,748 | 2/1992 | Usui et al. . |
| 5,094,481 | 3/1992 | Takikawa et al. . |
| 5,098,136 | 3/1992 | Washizu . |
| 5,112,084 | 5/1992 | Washizu . |
| 5,114,250 | 5/1992 | Usui . |
| 5,127,682 | 7/1992 | Washizu . |
| 5,131,691 | 7/1992 | Washizu . |
| 5,141,264 | 8/1992 | Usui . |
| 5,154,450 | 10/1992 | Washizu . |
| 5,154,451 | 10/1992 | Washizu . |
| 5,160,177 | 11/1992 | Washizu . |
| 5,163,719 | 11/1992 | Washizu . |
| 5,172,940 | 12/1992 | Usui et al. . |
| 5,176,412 | 1/1993 | Washizu . |
| 5,211,427 | 5/1993 | Washizu . |
| 5,314,216 | 5/1994 | Umezawa ........................ 285/319 |
| 5,324,081 | 6/1994 | Umezawa . |
| 5,328,216 | 7/1994 | Miyauchi et al. . |
| 5,338,073 | 8/1994 | Washizu et al. . |
| 5,354,106 | 10/1994 | Washizu et al. . |

*Primary Examiner*—Dave W. Arola
*Assistant Examiner*—Heather Shackelford
*Attorney, Agent, or Firm*—Anthony J. Casella; Gerald E. Hespos

[57] ABSTRACT

A connector for a pipe joint has a plurality of ridges formed on its inner surface and engaging the outer surface of a pipe. An annular bush fitted between the connector and the pipe inserted therein also has a plurality of ridges formed on its inner surface and engaging the outer surface of the pipe. These ridges can hold the pipe against any undesirable axial or radial displacement from the connector.

10 Claims, 9 Drawing Sheets

PRIOR ART 5,575,512

PIPE JOINT

BACKGROUND OF THE INVENTION

1. Field of the Invention

This invention relates to a pipe joint, and more particularly, to one for a pipe having a diameter of 20 mm or less and used in a pipeline for supplying oil or gas to a vehicle or machine.

2. Description of the Prior Art

A known pipe joint of the type to which this invention pertains is shown in FIG. 24, and comprises a pipe P, a connector 1 and a socket 2. The connector 1 has an axial bore 24 and a diametrically enlarged chamber 23 which is axially contiguous to the axial bore 24 and includes a chamber having a small diameter and holding seal rings 26, and a chamber contiguous to it and having a large diameter. The wall of the chamber having a large diameter has a pair of diametrically opposite engaging holes 29 and 29'.

The socket 2 has an annular end wall 55 and a body extending axially from the end wall 55 and including a pair of radially outwardly directed engaging portions 28 and a pair of radially inwardly directed engaging lugs 25. The socket 2 is fitted in the connector 1. The engaging portions 28 of the socket 2 are engaged in the engaging holes 29 and 29', respectively, of the connector 1 to hold the socket 2 in position. The pipe P has a radially outwardly projecting annular wall protrusion P' near one end thereof. The wall protrusion P' is held between the engaging lugs 25 and an annular bush 27 in the connector 1.

The pipe P is easy to fit in the connector 1 and the socket 2 by a single step of operation if it is inserted at one end into the connector 1 until its wall protrusion P' is moved past the lugs 25 by forcing them radially outwardly. Upon movement of the wall protrusion P' past the lugs 25, the lugs 25 move back radially inwardly to their original positions and engage the wall protrusion P' to hold the pipe P against detachment.

When the pipe P is inserted as described above, its wall protrusion P' causes the lugs 25 to make an arcuate motion at their free ends. The arcuate motion of the lugs 25 includes their axial displacement toward the bush 27 and it is, therefore, necessary that the free ends of the lugs 25 and the bush 27 have therebetween a distance which is sufficiently large to permit the axial displacement of the lugs 25, and which is larger than the thickness of the wall protrusion P' of the pipe P. It is, therefore, likely that the pipe P may be displaced axially of the pipe joint, since its wall protrusion P' is not tightly held between the lugs 25 and 27.

It has also been proposed that the relevant portion of the connector 1 and the bush 27 have an inside diameter which is equal to, or slightly smaller than, the outside diameter of the pipe P, so that the pipe P may be tightly fitted so as not to be displaced radially of the pipe joint. This proposal is, however, not practically acceptable for the efficient manufacture of a large number of pipe joints, since the pipe is not easy to fit in the connector or bush having such an inside diameter, but it is usual practice to form the connector and bush with an inside diameter which is slightly larger than the outside diameter of the pipe. Thus, it is likely that the axial and radial displacement of the pipe may occur and cause the seal rings 26 to get worn and fail to maintain a tight fluid seal, particularly when the pipe joint is subjected to vibration.

SUMMARY OF THE INVENTION

Under these circumstances, it is an object of this invention to provide a pipe joint in which a pipe can be held against any undesirable axial or radial displacement.

This object is attained by a pipe joint comprising a pipe having a first radially outwardly projecting annular wall protrusion near one end thereof, a connector in which the pipe is fitted at and near one end thereof, a socket attached to the connector and having a plurality of radially outwardly projecting engaging portions by which the socket is held to the connector, and a plurality of radially inwardly projecting engaging lugs, a plurality of seal rings surrounded by the connector and surrounding the pipe, and a first annular bush fitted in the connector between the wall protrusion of the pipe and the seal rings, the wall protrusion of the pipe being held between the lugs and the bush to hold the pipe in position, and characterized by including means provided between the pipe and the connector for producing friction to hold them against any axial or radial displacement relative to each other.

The friction producing means may comprise an uneven surface defining the inner periphery of the connector, or the first bush and making frictional contact with the outer periphery of the pipe.

The friction producing means may alternatively comprise a second annular bush fitted between the inner surface of the connector and the outer surface of the pipe on the opposite side of the seal rings from the first bush, or may alternatively comprise the first bush so fitted as to maintain frictional contact with the inner surface of the connector and the wall protrusion of the pipe.

As another alternative, the friction producing means may comprise a second radially outwardly projecting wall protrusion formed on the pipe on the opposite side of the lugs from the first wall protrusion and maintaining frictional contact with the inner surface of the connector.

As a further alternative, the friction producing means may comprise a second radially outwardly projecting wall protrusion formed on the pipe on the opposite side of the lugs from the first wall protrusion, and a stabilizer fitted between the second wall protrusion and the inner surface of the connector in frictional engagement therewith.

The friction producing means can hold the pipe and the connector against any axial and radial, and even circumferential displacement relative to each other and thereby prevent the seal rings from getting undesirably worn and failing to maintain a tight fluid seal, even if the pipe joint may be used in a highly vibratory environment.

DESCRIPTION OF THE PREFERRED EMBODIMENTS

Figure 1:
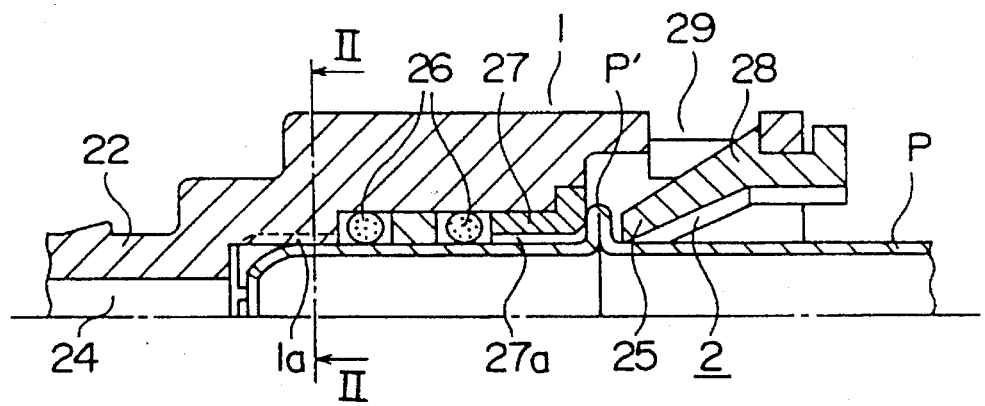
FIG. 1 is a fragmentary longitudinal sectional view of a pipe joint according to a first embodiment of this invention.

The invention will now be described more specifically by way of several preferred embodiments thereof as shown in FIGS. 1 to 23. The pipe joint of this invention is, however, characterized by means for producing friction, as stated above, while in other respects, it is generally identical in construction to the known pipe joint which has been described with reference to FIG. 24. The description which will now be made is, therefore, substantially limited to the means for producing friction, and no repeated description is made of any common features, as like reference numerals are used to denote like parts or features throughout FIGS. 1 to 23 and 24.

Figure 2:
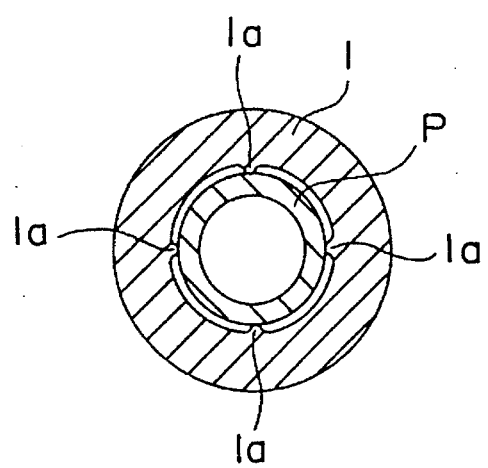
FIG. 2 is a transverse sectional view of the pipe joint as taken along the line II—II of FIG. 1.
Figure 3:
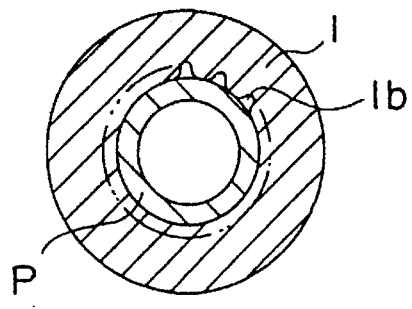
FIG. 3 is a view similar to FIG. 2, but showing a modified form of the pipe joint.
Figure 4:
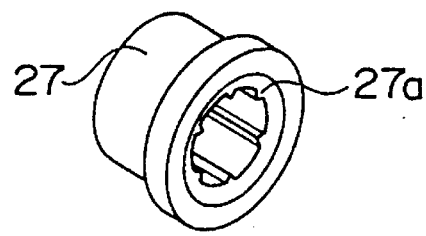
FIG. 4(a) is a perspective view of a first annular bush in the pipe joint shown in FIG. 1.
FIG. 4(b) is a view similar to FIG. 4(a), but showing a modified form of the bush.
Figure 4:
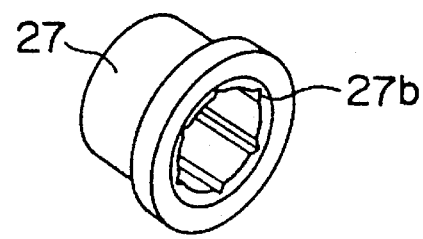

Reference is first made to FIGS. 1 to 6 showing a pipe joint according to a first embodiment of this invention. The connector 1 in the pipe joint shown in FIG. 1 has an uneven inner surface surrounding a pipe P adjacent to one end thereof, and formed by a plurality of ridges 1a extending axially of the connector 1, as shown in FIG. 2. The connector 1 may alternatively have an uneven inner surface formed by a plurality of grooves 1b, as shown in FIG. 3. The pipe joint includes a first annular bush 27 having an uneven inner surface formed by a plurality of axially extending ridges 27a, as shown in FIG. 4(a). The bush 27 may alternatively have an uneven inner surface formed by a plurality of axially extending grooves 27b, as shown in FIG. 4(b). The uneven inner surfaces of the connector 1 and the bush 27 are in resilient contact with the outer periphery of the pipe P, and define means for producing friction to hold the pipe P and the connector 1 against any undesirable axial or radial displacement from each other.

Figure 5:
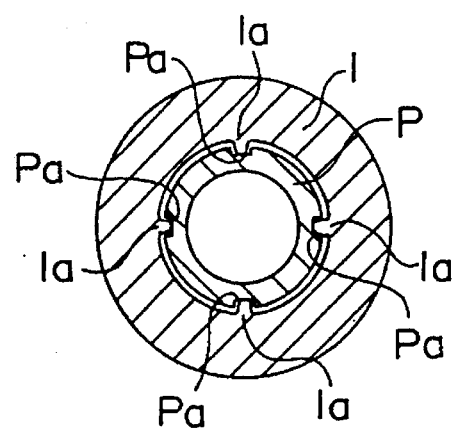
FIG. 5 is a view similar to FIG. 2, but showing another modified form of the pipe joint.

FIG. 5 shows a modified form of the structure shown in FIG. 2. The pipe P has a plurality of axially extending grooves Pa formed in its outer surface adjacent to one end thereof, and each of the ridges 1a on the inner surface of the connector 1 is fitted in one of the grooves Pa. This arrangement makes it possible to prevent not only any axial or radial displacement of the pipe P and the connector 1, but also any undesirable circumferential displacement thereof, from each other.

Figure 6:
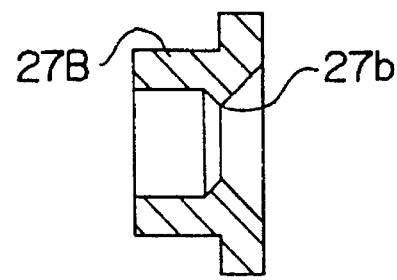
FIG. 6 is a longitudinal sectional view of another modified form of the bush.
Figure 7:
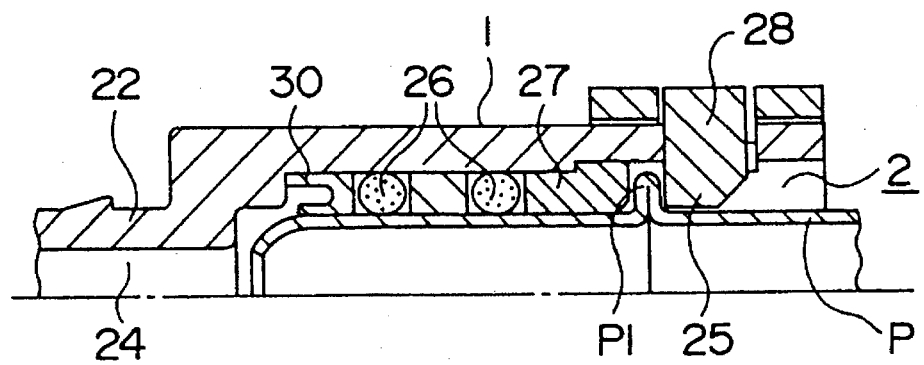
FIG. 7 is a fragmentary longitudinal sectional view of a pipe joint according to a second embodiment of this invention.
Figure 8:
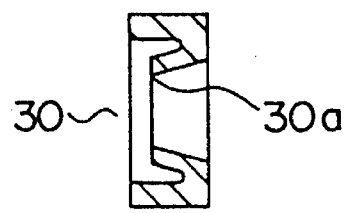
FIG. 8 is a longitudinal sectional view of a second annular bush in the pipe joint shown in FIG. 7.

FIG. 6 shows a modified form of annular bush. The bush 27B has an annular ridge 27c formed on its inner surface inwardly of one end thereof, and maintaining resilient contact with the outer periphery of the pipe P.

Reference is now made to FIGS. 7 to 11 showing a pipe joint according to a second embodiment of this invention. The pipe joint shown in FIG. 7 has a socket 2 fitted about a connector 1 instead of being fitted therein as described above, and having a circumferentially extending elastic arm from which a pair of radially inwardly directed lugs 25 project into the connector 1 through its holes 29 (see U.S. Pat. No. 5,354,106). The pipe joint includes a second annular bush 30 fitted between the connector 1 and a pipe P adjacent to one end of the pipe P on the opposite side of seal rings 26 from a first annular bush 27, and defining means for producing friction to hold the pipe P and the connector 1 against any undesirable axial or radial displacement from each other. The bush 30 is a double-walled annular body formed from an elastic material, and having an axially and radially inwardly directed inner wall defining an annular lip 30a which maintains effective frictional contact with the outer periphery of the pipe P.

Figure 11:
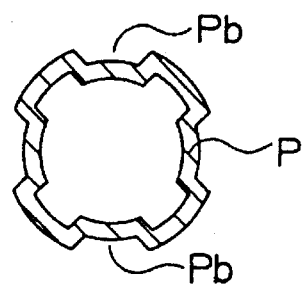
FIG. 11 is a transverse sectional view of the pipe in the pipe joint shown in FIG. 7.

The pipe P may have a plurality of axially extending grooves Pb formed in its outer surface, as shown in FIG. 11, so that the annular lop 30a of the bush 30 can be elastically engaged in the grooves Pb. This arrangement makes it possible to prevent any undesirable rotational displacement of the pipe P and the connector 1 from each other, too.

Figure 9:
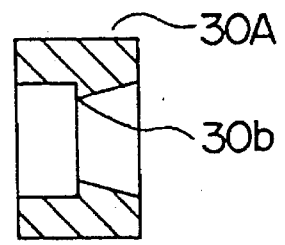
FIG. 9 is a view similar to FIG. 8, but showing a modified form of the second bush.
Figure 10:
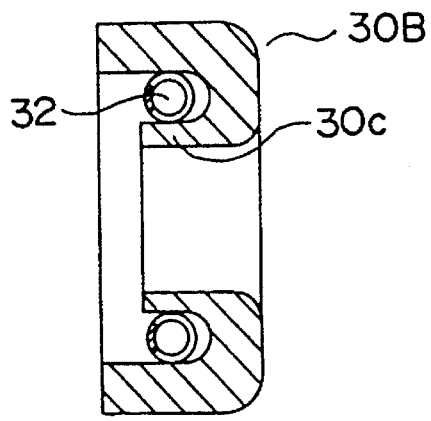
FIG. 10 is a longitudinal sectional view of another modified form of the second bush.

FIG. 9 shows a modified form of second annular bush. The bush 30A has an annular ridge 30b extending radially and axially inwardly from one end thereof, and maintaining resilient contact with the outer periphery of the pipe P. FIG. 10 shows another modified form of second annular bush. The bush 30B is a double-walled body having an inner wall defining an annular lip 30c, and holds a garter spring 32 between its lip 30c and its outer wall. The garter spring 32 ensures still more effective frictional engagement of the bush 30B with the outer periphery of the pipe P. It is needless to say that the bush 30A or 30B shown in FIG. 9 or 10 can be used with the pipe P shown in FIG. 11.

Figure 12:
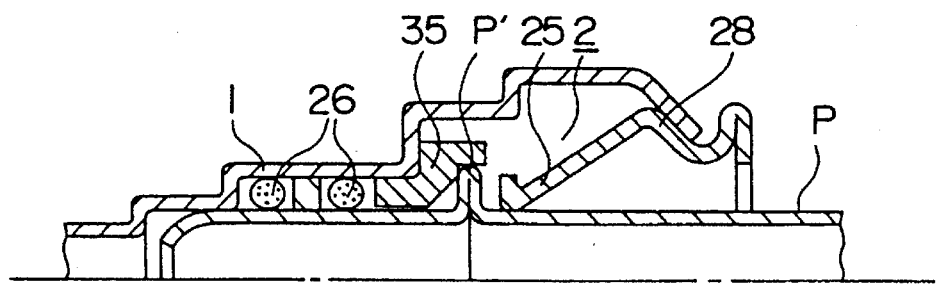
FIG. 12 is a fragmentary longitudinal sectional view of a pipe joint according to a third embodiment of this invention.
Figure 13:
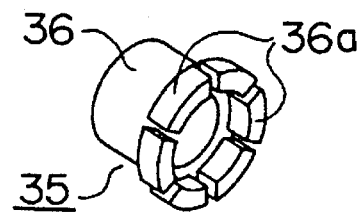
FIG. 13 is a perspective view of an annular bush in the pipe joint shown in FIG. 12.
Figure 14:
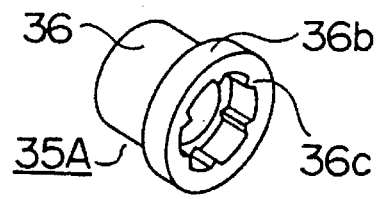
FIG. 14 is a view similar to FIG. 13, but showing a modified form of the bush.

Attention is now directed to FIGS. 12 to 14 showing a pipe joint according to a third embodiment of this invention. The pipe joint shown in FIG. 12 has a socket 2 formed from a sheet of material by plastic working, and a connector 1 having a radially inwardly bent end portion held against the engaging portions 28 of the socket 2. The pipe joint includes a first annular bush 35 fitted between the connector 1 and a pipe P and engaging the outer edge of the wall protrusion P' of the pipe P, and defining means for producing friction to hold the pipe P and the connector 1 against any undesirable axial or radial displacement from each other. The bush 35 comprises a cylindrical body 36 and an annular wall projecting axially and radially outwardly from one end thereof, having an inside diameter somewhat larger than that of the cylindrical body 36, and formed from a plurality of circumferentially separate wall portions 36a, as shown in FIG. 13. The wall portions 36a engage the outer edge of the wall protrusion P' of the pipe P. FIG. 14 shows a modified form of bush. The bush 35A comprises a cylindrical body 36 and an annular wall 36b projecting axially and radially outwardly from one end thereof, having an inside diameter somewhat larger than that of the cylindrical body 36, and formed as a single body. The annular wall 36b has a plurality of circumferentially spaced apart ridges 36c formed on its inner periphery, and adapted to make frictional contact with the outer edge of the wall protrusion P' of the pipe P.

Description will now be made of pipe joints according to fourth, fifth and sixth embodiments of this invention. Each of these pipe joints has a socket 2 formed from a sheet of spring material and fitted in, or attached to a connector 1, and is saliently featured by including a second radially outwardly projecting wall protrusion PS formed on a pipe P on the opposite side of lugs 25 from its first wall protrusion P', and an annular stabilizer 37 or 37a fitted between the connector 1 and the pipe P and engaging the second wall protrusion PS of the pipe P. The second wall protrusion PS of the pipe and the stabilizer 37 or 37a define means for producing friction to hold the pipe P and the connector 1 against any undesirable axial or radial displacement from each other.

Figure 15:
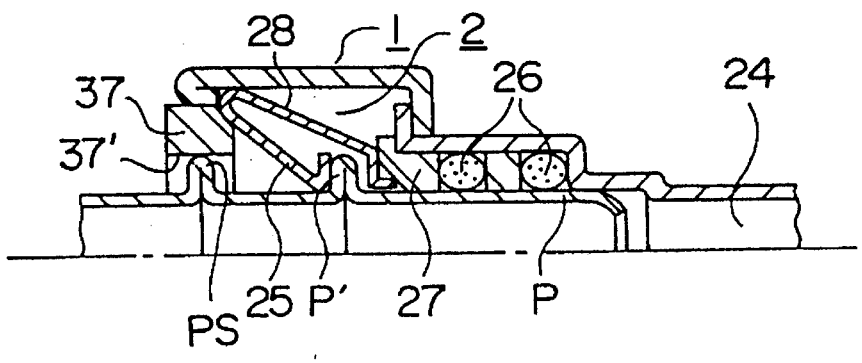
FIG. 15 is a fragmentary longitudinal sectional view of a pipe joint according to a fourth embodiment of this invention.

The fourth embodiment is shown in FIG. 15. The stabilizer 37 has a central hole 37' in which the second wall protrusion PS of the pipe P is tightly fitted.

Figure 16:
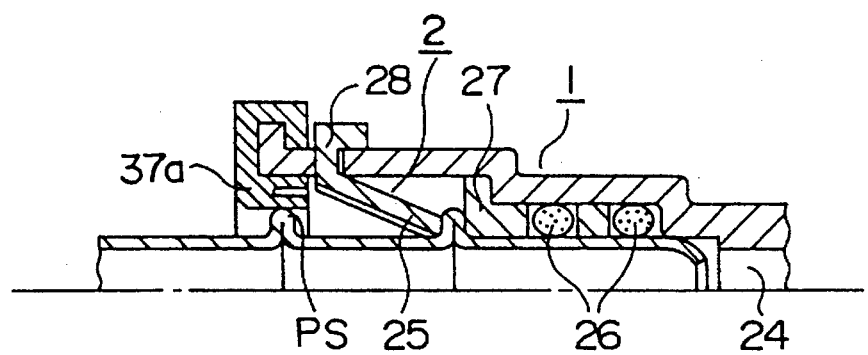
FIG. 16 is a fragmentary longitudinal sectional view of a pipe joint according to a fifth embodiment of this invention.
Figure 17:
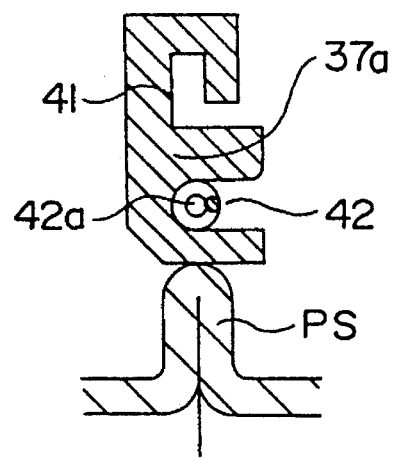
FIG. 17 is a fragmentary longitudinal sectional view of a stabilizer in the pipe joint shown in FIG. 16.

The fifth embodiment is shown in FIG. 16. The stabilizer 37a is shown in FIG. 17, and has an annular recess 41 in which the connector 1 is fitted along one end thereof, as shown in FIG. 16. The stabilizer 37a also has another annular recess 42 adapted to hold a garter spring 42a, as shown in FIG. 17. The garter spring 42a ensures still firmer and more effective engagement of the stabilizer 37a with the wall protrusion PS of the pipe P.

Figure 18:
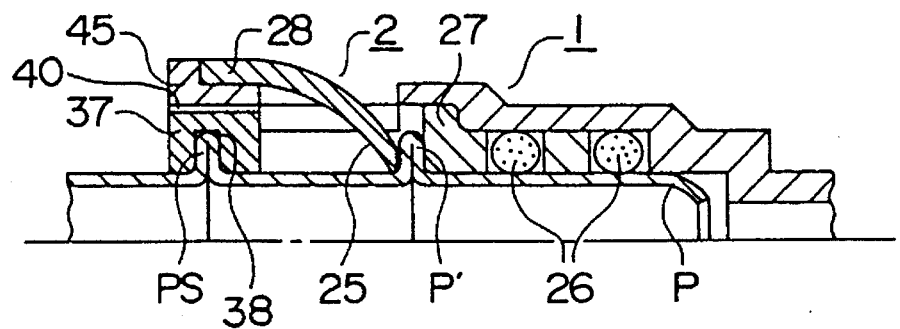
FIG. 18 is a fragmentary longitudinal sectional view of a pipe joint according to a sixth embodiment of this invention.
Figure 19:
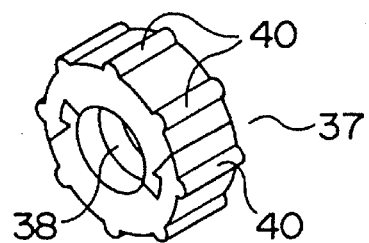
FIG. 19 is a perspective view of a stabilizer in the pipe joint shown in FIG. 18.

The sixth embodiment is shown in FIG. 18. The stabilizer 37 is shown in FIG. 19, and is a ring having along its inner periphery an annular groove 38 in which the wall protrusion PS of the pipe P is engaged, while its outer periphery has a plurality of axially extending and circumferentially spaced apart ridges 40. The connector 1 has at its end surrounding the wall protrusion PS an annular shoulder 45 having an inner periphery held in frictional engagement with the ridges 40 on the stabilizer 37, while its outer periphery is held against the engaging portions 28 of the socket 2.

Figure 20:
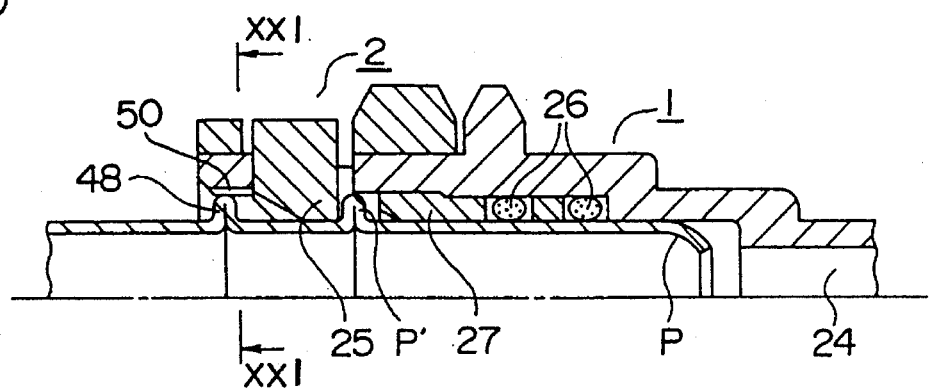
FIG. 20 is a fragmentary longitudinal sectional view of a pipe joint according to a seventh embodiment of this invention.
Figure 21:
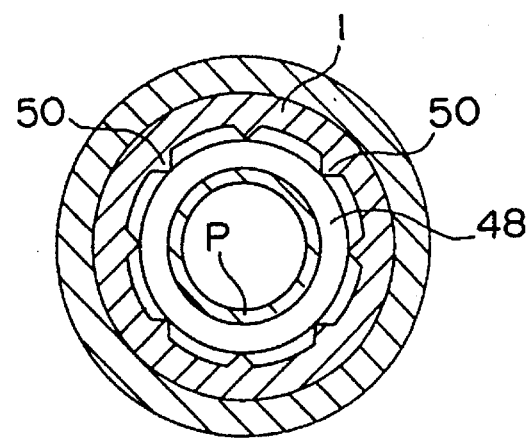
FIG. 21 is a transverse sectional view of the pipe joint as taken along the line XXI—XXI of FIG. 20.

Reference is now made to FIGS. 20 and 21 showing a pipe joint according to a seventh embodiment of this invention. The pipe joint includes a connector 1 having a plurality of axially extending and circumferentially spaced apart ridges 50 formed on its inner periphery adjacent to one end thereof, and a pipe P having a second radially outwardly projecting wall protrusion 48 formed on the opposite side of the lugs 25 of a socket 2 from its first wall protrusion P' and engaging the ridges 50. The wall protrusion 48 and the ridges 50 define means for producing friction. There is no stabilizer, or nothing else fitted between the connector 1 and the wall protrusion 48 of the pipe P.

Figure 22:
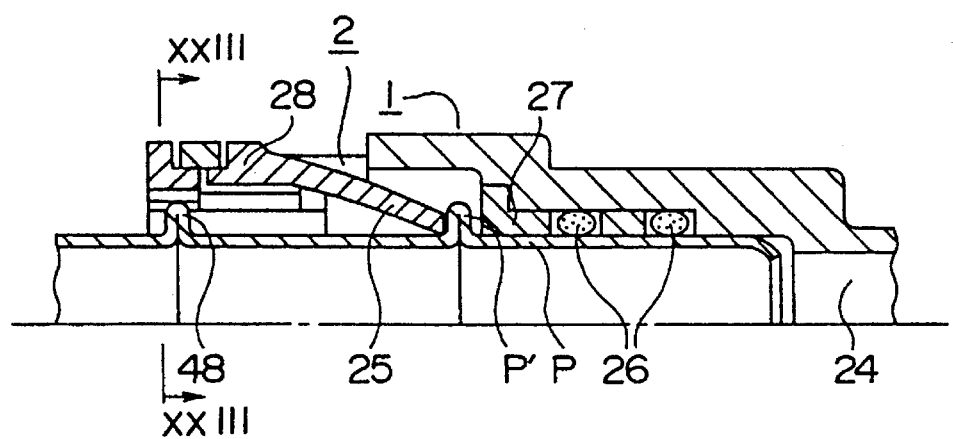
FIG. 22 is a fragmentary longitudinal sectional view of a pipe joint according to an eighth embodiment of this invention.
Figure 23:
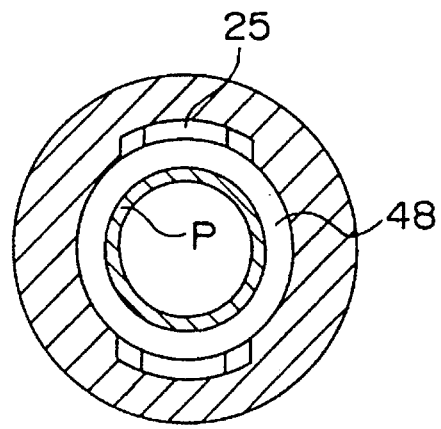
FIG. 23 is a transverse sectional view of the pipe joint as taken along the line XXIII—XXIII of FIG. 22.
Figure 24:
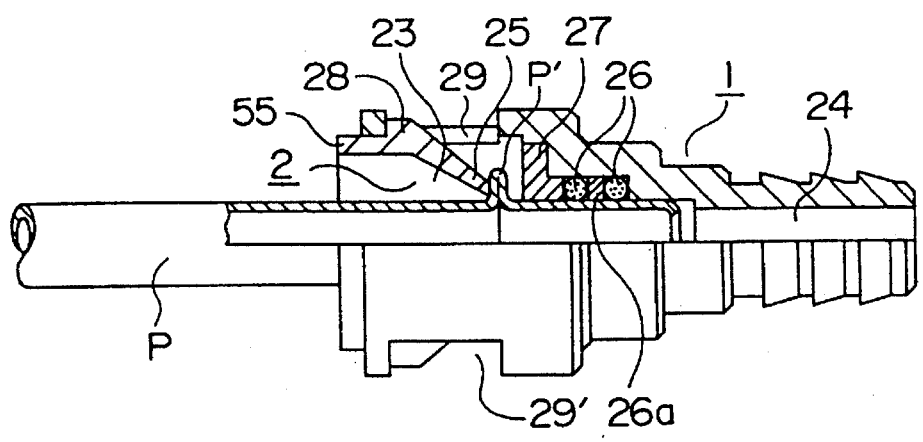
FIG. 24 is a side elevational view, partly in section, of a known pipe joint.

Referring finally to FIGS. 22 and 23, there is shown a pipe joint according to an eighth embodiment of this invention. The pipe joint has a pipe P having a second radially outwardly projecting wall protrusion 48 formed on the opposite side of the lugs 25 of a socket 2 from its first wall protrusion P', and engaging the inner surface of a connector 1. There is no stabilizer, or nothing else fitted between the connector 1 and the wall protrusion 48 of the pipe P.

What is claimed is:

1. In a pipe joint comprising a pipe having a first radially outwardly projecting annular wall protrusion near one end thereof, a connector in which said pipe is fitted at and near said one end thereof, a socket attached to said connector and having a plurality of radially outwardly projecting engaging portions by which said socket is held to said connector, and a plurality of radially inwardly projecting engaging lugs, a plurality of seal rings surrounded by said connector and surrounding said pipe, and a first annular bush fitted in said connector between said wall protrusion and said seal rings, said wall protrusion being held between said lugs and said bush to hold said pipe in position, the improvement which comprises means provided between said pipe and said connector for producing friction to hold them against any axial and radial displacement from each other.

2. In a pipe joint comprising a pipe having a first radially outwardly projecting annular wall protrusion near one end thereof, a connector in which said pipe is fitted at and near said one end thereof, a socket attached to said connector and having a plurality of radially outwardly projecting engaging portions by which said socket is held to said connector, and a plurality of radially inwardly projecting engaging lugs, a plurality of seal rings surrounded by said connector and surrounding said pipe, and a first annular bush fitted in said connector between said wall protrusion and said seal rings, said wall protrusion being held between said lugs and said bush to hold said pipe in position, the improvement which comprises an uneven surface defining the inner periphery of each of said connector and said bush, and maintaining frictional contact with the outer periphery of said pipe to hold said pipe and said connector against any axial or radial displacement from each other.

3. A pipe joint as set forth in claim 2, wherein said uneven surface is defined by a plurality of axially extending and circumferentially spaced apart ridges formed on said inner periphery.

4. A pipe joint as set forth in claim 3, wherein said pipe has a plurality of axially extending and circumferentially spaced apart grooves formed in said outer periphery thereof, and each of said ridges is fitted in one of said grooves.

5. A pipe joint as set forth in claim 1, wherein said means comprises a second annular bush fitted between the inner periphery of said connector and the outer periphery of said pipe on the opposite side of said seal rings from said first bush.

6. A pipe joint as set forth in claim 1, wherein said means comprises said first bush so fitted as to maintain frictional contact with the inner surface of said connector and said wall protrusion.

7. A pipe joint as set forth in claim 1, wherein said means comprises a second radially outwardly projecting wall protrusion formed on said pipe on the opposite side of said lugs from said first wall protrusion and maintaining frictional contact with the inner surface of said connector.

8. A pipe joint as set forth in claim 7, further including an annular stabilizer fitted between said second wall protrusion and said inner surface of said connector in frictional engagement therewith.

9. In a pipe joint comprising a pipe having a first radially outwardly projecting annular wall protrusion near one end thereof, a connector in which said pipe is fitted at and near said one end thereof, a socket attached to said connector and having a plurality of radially outwardly projecting engaging portions by which said socket is held to said connector, and a plurality of radially inwardly projecting engaging lugs, a plurality of seal rings surrounded by said connector and surrounding said pipe, and a first annular bush fitted in said connector between said wall protrusion and said seal rings, said wall protrusion being held between said lugs and said bush to hold said pipe in position, the improvement which comprises an uneven surface defined on an inner peripheral portion of said connector frictionally engaging an outer peripheral portion of said pipe for holding the connector and the pipe against any axial and radial displacement from each other.

10. In a pipe joint comprising a pipe having a first radially outwardly projecting annular wall protrusion near one end thereof, portions of said pipe between said end and said radially outwardly projecting annular wall protrusion defining a smoothly cylindrically generated outer peripheral portion; a connector in which said pipe is fitted at and near said one end thereof, a socket attached to said connector and having a plurality of radially outwardly projecting engaging portions by which said socket is held to said connector, and a plurality of radially inwardly projecting engaging lugs, a plurality of seal rings surrounded by said connector and surrounding said pipe, and a first annular bush frictionally fitted in said connector between said wall protrusion and said seal rings, said wall protrusion being held between said lugs and said bush to hold said pipe in position, the improvement which comprises an uneven surface defined on an inner peripheral portion of said bush frictionally engaging said smoothly cylindrically generated outer peripheral portion of said pipe for holding the bush and the pipe against any axial and radial displacement from each other.

* * * * *